Figure 1:
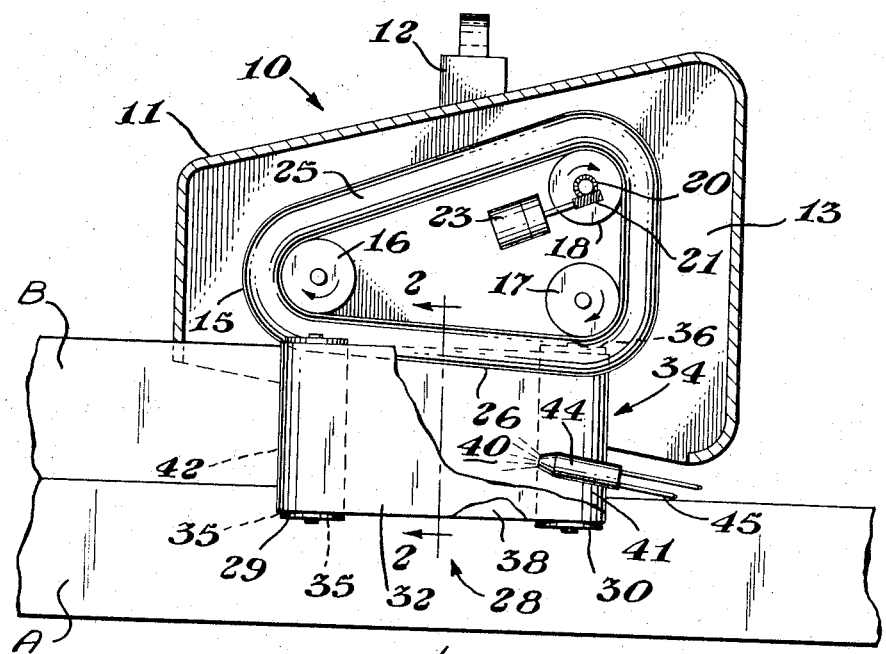

Aug. 22, 1967     H. S. SMITH, JR     3,336,631
APPARATUS FOR THE PREPARATION OF WALLED STRUCTURES
Filed March 4, 1966

INVENTOR.
Hubert S. Smith Jr.
BY
AGENT

United States Patent Office 3,336,631
Patented Aug. 22, 1967

3,336,631
APPARATUS FOR THE PREPARATION OF WALLED STRUCTURES
Hubert S. Smith, Jr., Bay City, Mich., assignor to The Dow Chemical Company, Midland, Mich., a corporation of Delaware
Filed Mar. 4, 1966, Ser. No. 531,719
8 Claims. (Cl. 18—5)

This invention relates to an apparatus for the preparation of walled structures and more particularly relates to an apparatus for the preparation of walled structures from hardenable, foamable resinous material.

Walled structures have been prepared from foam synthetic resinous strips of particulate expandable thermoplastic resinous material which on expansion knit together to form a unitary cellular body. U.S. 3,206,899 discloses methods whereby walled structures are prepared from strips and particulate expandable particles. Oftentimes it is desired to build walled structures from synthetic resinous foamable materials wherein the starting material is a liquid foamable, hardenable composition. The apparatus disclosed in U.S. 3,206,899 is generally unsuitable for use with such foamable, hardenable materials.

It would be advantageous if there were available an apparatus suitable for the deposition of a foamable, hardenable material in a generally helical spiral pattern to form a walled structure.

It would also be advantageous if there were available an apparatus for the deposition of a foamable hardenable material which would partially restrain the expandable foamable, hardenable material during the deposition and curing thereof.

It would also be desirable if there were available an apparatus for the deposition of foamable, hardenable material which would permit the upper surface of the deposited foam to assume a desired configuration.

These benefits and other advantages, in accordance with the present invention, are achieved in a material depositing head for depositing synthetic resinous foamable, hardenable liquid in a predetermined pattern upon the surface of a foamed material, the apparatus comprising in cooperative combination a frame, the frame supporting a top forming belt assembly, the top forming belt assembly comprising at least two rotatably mounted rolls having a deformable endless belt passing about the periphery thereof, the rolls adapted to rotate about generally parallel axes, a first side belt assembly comprising at least a pair of first side belt rolls, the side belt rolls having a first side forming belt passing about the periphery thereof, the first side belt rolls rotating about generally parallel axes, a second forming side belt assembly comprising at least a pair of second side belt forming rolls, the second side belt forming rolls rotating about general parallel axes which are also parallel to the axes of the first side belt forming rolls, the first and second side belt forming assemblies having an upper edge and a lower edge, the first and second side belt assemblies being disposed on either side of a forming portion of the top forming belt, the top forming belt and the side belts defining a three sided channel, the side belts adapted to engage the top forming belt, the channel having a first end and a second end, a dispenser positioned generally adjacent the first end of the channel and adapted to dispense foamable, hardenable material therein, means to drive the top forming belt and the side belts at a substantially equal rate and like direction in the region forming the channel.

Figure 2:
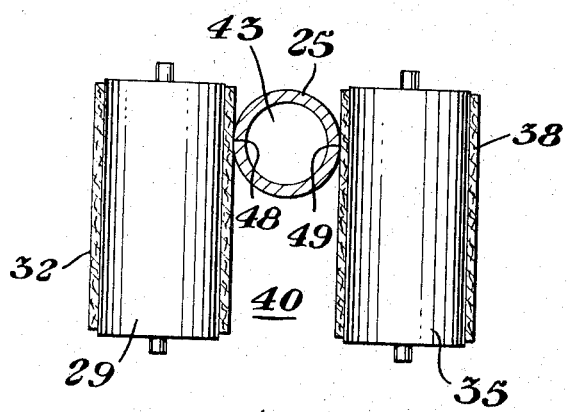

Further features and advantages of the present invention will become more apparent from the following specification when taken in connection with the drawing wherein:

FIGURE 1 is a schematic cutaway representation of an apparatus in accordance with the present invention;
FIGURE 2 is a section of the belts of the apparatus of FIGURE 1 taken along the line 2—2; and
FIGURE 3 is a cross-section of an alternate belt for use in the apparatus of FIGURE 1.

In FIGURE 1 there is schematically represented a sectional view of a material depositing head generally designated by the reference numeral 10. The material depositing head 10 comprises a frame 11. A head support pivot 12 is affixed to the frame 11 and so constructed and arranged so as to pivotally support the head 10 from a boom or arm such as the arm 28 of FIGURE 2 of U.S. 3,206,-899. The frame 11 defines an internal cavity 13. Supported within the cavity 13 is a top forming belt assembly generally designated by the reference numeral 15. The top forming belt assembly 15 comprises a first idler roll 16, a second idler roll 17 and a driven roll 18 arranged in a generally triangular configuration. The rolls 16, 17 and 18 are rotatably supported by the frame by means not shown. The driven roll 18 has affixed thereto a worm gear 20 which is in operative engagement with a worm 21. The worm 21 is rotated by means of the motor or rotating means 23 which in turn is affixed to the frame 11. A top forming belt 25 passes about the rolls 16, 17 and 18. The belt 25 is of a soft defoamable material. The belt 25 has a foam forming surface 26 generally lying between the rolls 16 and 17 and remotely disposed therefrom. A first side forming belt assembly 28 is disposed adjacent the forming surface 26 of the belt 25. The first side belt assembly 28 comprises a first roll 29 and a second roll 30 and a first side forming belt 32 passing about the periphery of the rolls 29 and 30. The rolls 29 and 30 rotate about generally parallel axes. A second forming belt assembly generally designated by the reference numeral 34 is disposed parallel to the first forming belt 28. A second belt forming assembly comprises a first roll 35 and a second roll 36 and a second side forming belt 38 passing about the periphery of the rolls 35 and 36. The rolls 35 and 36 rotate about generally parallel axes which are, in turn, generally parallel to the axes of rolls 29 and 30. The first and second side belt assemblies 28 and 34, together with the forming face 26 of the top forming belt 25, define a three sided channel 40. The channel 40 has a first or entrance end 41 and a second or exit end 42. A material depositing head 44 is disposed adjacent the first end 41 of the channel 44 and is adapted to deliver a foamable, hardenable material thereto. The head 44 is in operative communication with a supply means 45. A foam layer A and a freshly deposited foam layer B are shown in engagement with the head 10.

In FIGURE 2 there is depicted a section of the belt configuration of FIGURE 1 taken along the line 2—2. The belt 25 beneficially defines an internal cavity 43. The belt 25 contacts the surface of the side forming belts 32 and 38 at locations 48 and 49, respectively.

Figure 3:
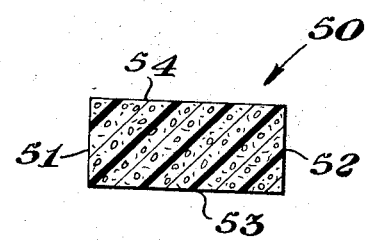

In FIGURE 3 there is depicted a section of an alternate top forming belt 50. The top forming belt 50 has a generally rectangular configuration and has sides 51 and 52, a forming face 53 of a non-adhering resinous material and a roll engagement face 54.

In operation of the apparatus, in accordance with the present invention, the head 10 is pivotally supported by the support 12 from a boom or arm such as the boom 28 of FIGURE 2 of U.S. Pat. 3,206,899. The motor 23 is activated to rotate the roll in a direction indicated by the arrow. Frictional engagement of the belt 25, with the side belts 32 and 38, causes the side belts 32 and 38 to travel with a surface speed similar to that of the top forming belt 25. Foamable, hardenable material, from the source 45, is discharged from the distributor 44 into the passageway 40 where it expands, hardens and bonds to a previously deposited foam layer such as the layer A of FIGURE 1. The freshly deposited foam layer is designated as B. The rate of travel of the depositing head 10 is adjusted in such a manner that the foam is self-supporting when it emerges from the second end 42 of the channel 40.

Beneficially, the foam depositing head, in accordance with the present invention, is particularly adapted and suited for use with foamable polyurethane compositions which beneficially are foamed while partially confined. The belt 25 is disposed in such a manner that the first end 41 of the channel 40 is of a substantially smaller dimension than the second or exit end 42. Thus, it serves to prevent premature unrestrained foaming.

Beneficially the forming belt 25 may be formed from a hollow self-supporting tube of a resilient material such as rubber or like elastomers and beneficially is provided with a non-adhering coating such as polytetrafluoroethylene, polychlorotetrafluoroethylene and similar non-adhering fluorocarbon polymers. The circular cross-sectional configuration of the belt, such as the belt 25, is particularly advantageous when mechanical inter-locking of adjacent deposited foam strips or layers is desired and where excellent chemical adhesion is obtained between adjacent layers. It is frequently beneficial to employ a belt such as the belt 50 of FIGURE 3 having a generally rectangular cross-section and prepared from a material such as a cellular elastomer such as foam rubber.

Beneficially the top forming belts of the apparatus of the present invention are deformed slightly between the side forming belts to provide a seal and prevent leakage of the hardenable, foamable material from the channel such as the channel 40.

The apparatus of the present invention is particularly advantageous for the preparation of dome structures having a relatively small diameter relative to the length of the foam curing apparatus. Because of the configuration of the top forming belt, the side belts and top forming belts readily conform to a generally circular configuration. Desirably, in some instances the side belts such as the belts 32 and 38 may be inwardly tensioned adjacent the channel 40 and outwardly tensioned by means of suitable rolls to provide the degree of confirmation of the belts desired. Usually, it is beneficial that the top forming or deformable belt be disposed in such a manner that the channel 40 has a smaller cross-sectional area adjacent the entrance and the exit end as is shown in FIGURE 1. In this way, as the foaming head 10 is moved about in a circular path, no tendency exists for the top forming belt adjacent the rearmost roll such as the roll 16 of FIGURE 1 to crush the foam that has been generated. The degree of penetration of the foremost portion of the top forming belt such as the belt 25 or 50 into the space defined between the side forming assemblies will vary somewhat with the relative dimensions of the foam depositing head, the deformability of the belt and the rate of cure and expansion of the foamable composition being deposited.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a material depositing head for depositing synthetic resinous foamable, hardenable liquid in a predetermined pattern upon the surface of a foamed material, the apparatus comprising in cooperative combination a frame, the frame supporting a top forming belt assembly, the top forming belt assembly comprising at least rotatably mounted rolls having a deformable endless belt passing about the periphery thereof, the rolls adapted to rotate about generally parallel axes, a first side belt assembly comprising at least a pair of first side belt rolls, the side belt rolls having a first side forming belt passing about the periphery thereof, the first side belt rolls rotating about generally parallel axes, a second forming side belt assembly comprising at least a pair of second side belt forming rolls, the second side belt forming rolls rotating about a generally parallel axes which are also parallel to the axes of the first side belt rolls, the first and second side belt forming assemblies each having an upper edge and a lower edge, the first and second side belt assemblies being disposed on either side of a forming portion of the top forming belt, the top forming belt and the side belts defining a three-sided channel, the side belts adapted to engage the top forming belt, the channel having a first end and a second end, a dispenser positioned generally adjacent the first end of the channel and adapted to dispense foamable, hardenable material therein, means to drive the top forming belts and the side belts at a substantially equal rate in a like direction in the ridge forming the channel.

2. The apparatus of claim 1 wherein the top forming belt is a resilient hollow member.

3. The apparatus of claim 2 wherein the belt has a generally circular configuration.

4. The apparatus of claim 1 wherein the top forming belt projects a great distance into the space between the side forming belts at the first and at the second end.

5. The apparatus of claim 1 wherein the top forming belt is of a resilient cellular material.

6. The apparatus of claim 5 wherein the top forming belt has a generally rectangular cross section.

7. The apparatus of claim 1 wherein the forming belts have a non-adhering surface.

8. The apparatus of claim 7 wherein the non-adhering surface is polytetrafluoroethylene.

References Cited

UNITED STATES PATENTS

| | | | |
|---|---|---|---|
| 2,339,892 | 1/1944 | Urschel | 25—131 X |
| 2,506,716 | 5/1950 | Finnemore | 25—131 |
| 2,607,100 | 8/1952 | Urschel | 25—131 |
| 2,841,205 | 7/1958 | Bird | 264—47 |
| 2,877,530 | 3/1959 | Winn | 25—131 X |
| 3,206,899 | 9/1965 | Wright | 52—80 |

WILLIAM J. STEPHENSON, *Primary Examiner.*